United States Patent [19]

Adkins

[11] Patent Number: 5,171,631
[45] Date of Patent: Dec. 15, 1992

[54] SPACER/EXTENDER FOR TITANIUM DIOXIDE IN PIGMENT SYSTEMS FOR COATINGS

[75] Inventor: Adrian S. Adkins, Moraga, Calif.

[73] Assignee: Aluminum Company of America, Pittsburgh, Pa.

[21] Appl. No.: 555,928

[22] Filed: Jul. 19, 1990

[51] Int. Cl.$^5$ ............................................. B32B 5/16
[52] U.S. Cl. .................................... 428/328; 106/442; 106/446
[58] Field of Search ...................... 427/385.5; 106/428, 106/442, 446; 428/328

[56] References Cited

U.S. PATENT DOCUMENTS

| | | | |
|---|---|---|---|
| Re. 31,602 | 6/1984 | Makinen | 106/300 |
| 3,087,828 | 4/1963 | Linton | 106/446 |
| 3,220,867 | 11/1965 | O'Shaughnessy | 106/446 |
| 3,510,333 | 5/1970 | Gonick et al. | 106/446 |
| 3,595,822 | 7/1971 | Swank | 106/446 |
| 3,629,229 | 12/1971 | Schmank . | |
| 3,650,793 | 3/1972 | Goodspeed et al. | 106/428 |
| 4,227,935 | 10/1980 | Blake et al. | 106/442 |
| 4,376,655 | 3/1983 | Weber | 106/442 |
| 4,661,282 | 4/1987 | Clark | 252/179 |
| 4,898,618 | 2/1990 | Holcombe et al. | 106/287.34 |
| 4,989,794 | 2/1991 | Askew et al. | 241/16 |

FOREIGN PATENT DOCUMENTS

0298777A2 1/1989 European Pat. Off. .
0253635B1 7/1991 European Pat. Off. .

OTHER PUBLICATIONS

"Crowding and Spacing of Titanium Dioxide Pigments", *Journal of Coatings Technology*, vol. 60, No. 758, Mar. 1988, pp. 67-70 by Juergen Braun.

Stieg, F. B., "What Does the Coatings Industry Need for Titanium Dioxide Replacement", presented at the Global Outlook for TiO$_2$ & TiO$_2$ Replacements/Extenders in Coatings, Paper & Plastics, St. Louis, Mo., Mar. 1990.

Craft, R. W., "The Role of Extenders and Voids in Paint Opacity", presented at the Global Outlook for TiO$_2$ & TiO$_2$ Replacements/Extenders in Coatings, Paper & Plastics, St. Louis, Mo., Mar. 1990.

Craft, R. W., "Voids and Porosity: Effects on Paint Properties", *Moderan Paint and Coatings*, Dec. 1989.

Stieg, F. B., "Effect of Extender on Crowding of Titanium Pigment", *Journal of Coatings Technology*, vol. 61, No. 778, Nov. 1989.

Stieg, F. B., "Total Solids and the Titanium Shortage", *American Paint & Coatings Journal*, 13, Nov. 1989.

Craft, R. W., "Light Scattering by Titanium Dioxide Pigment", *Modern Paint and Coatings*, Oct. 1989.

(List continued on next page.)

Primary Examiner—Michael Lusignan
Assistant Examiner—Diana L. Dudash
Attorney, Agent, or Firm—John A. Bucher; Daniel A. Sullivan, Jr.

[57] ABSTRACT

A coating composition and method of coating for producing a coating containing at least 21-22% by volume titanium dioxide pigment for developing hiding on a suitable substrate, the coating composition having a pigment volume concentration (PVC) of up to a critical pigment volume concentration (CPVC), preferably a PVC of from about 25% to about 50-60% and more preferably from about 25% to about 45%, and a pigment system including an optional filler and a prime pigment comprising about 70-98% by volume titanium dioxide (TiO$_2$), preferably a rutile form having a median particle size of about 0.2 microns, and about 2-30% by volume of an aluminum trihydrate (ATH) spacer/extender pigment having a similar median particle size and particle size distribution, preferably substantially the same as for the TiO$_2$ pigment.

25 Claims, 6 Drawing Sheets

OTHER PUBLICATIONS

Craft, R. W., "Calculation Approach to Efficient TiO$_2$ Formulation in Coatings", Pacific Northwest Society for Coatings Technology, Spring Symposium, Portland, Ore., May 1989.

Stieg, F. B., "Relationship of Material Costs to Optimum Titanium Content", *Modern Paint and Coatings*, Mar. 1989.

Ross, W. D., "Light Scattering by Titanium Dioxide Pigment", Western Coatings Symposium, Anaheim, Calif., Feb. 1989.

Stieg, F. B., "Particle Size as a Formulating Parameter", presented at the 45th Annual Meeting of the Federation of Societies for Paint Technology, Minneapolis, Minn., Oct. 17, 1967.

Williams, J. E., Jr., "Hydrated Alumina Extenders", *Paint and Varnish Production*, Jun. 1967.

Ritter, H. W., et al., "Influence of Fine Particle Extenders on Hiding Pigment Performance in Latex Paints", *Journal of Paint Technology*, vol. 38, No. 500, Sep. 1966.

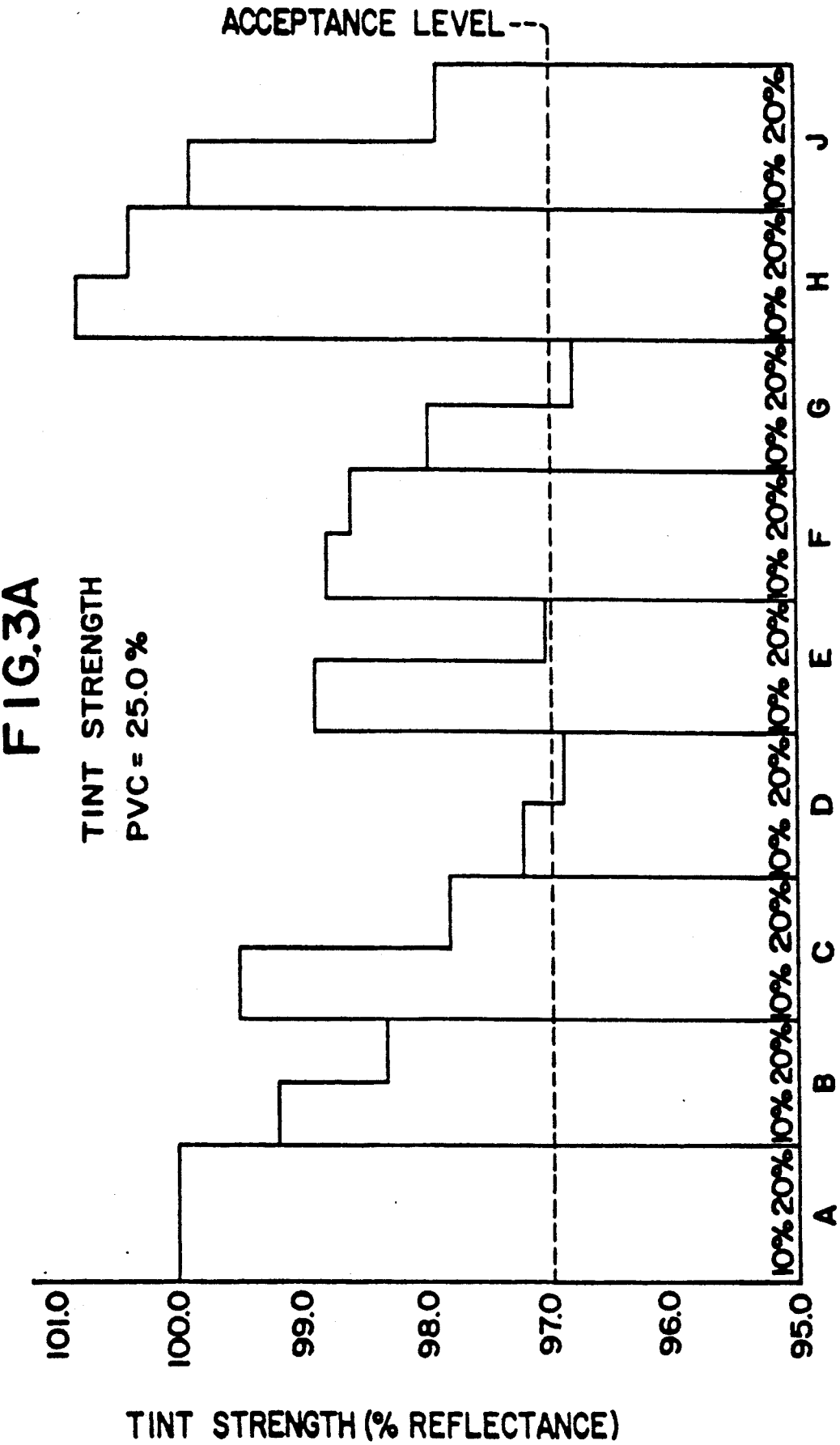

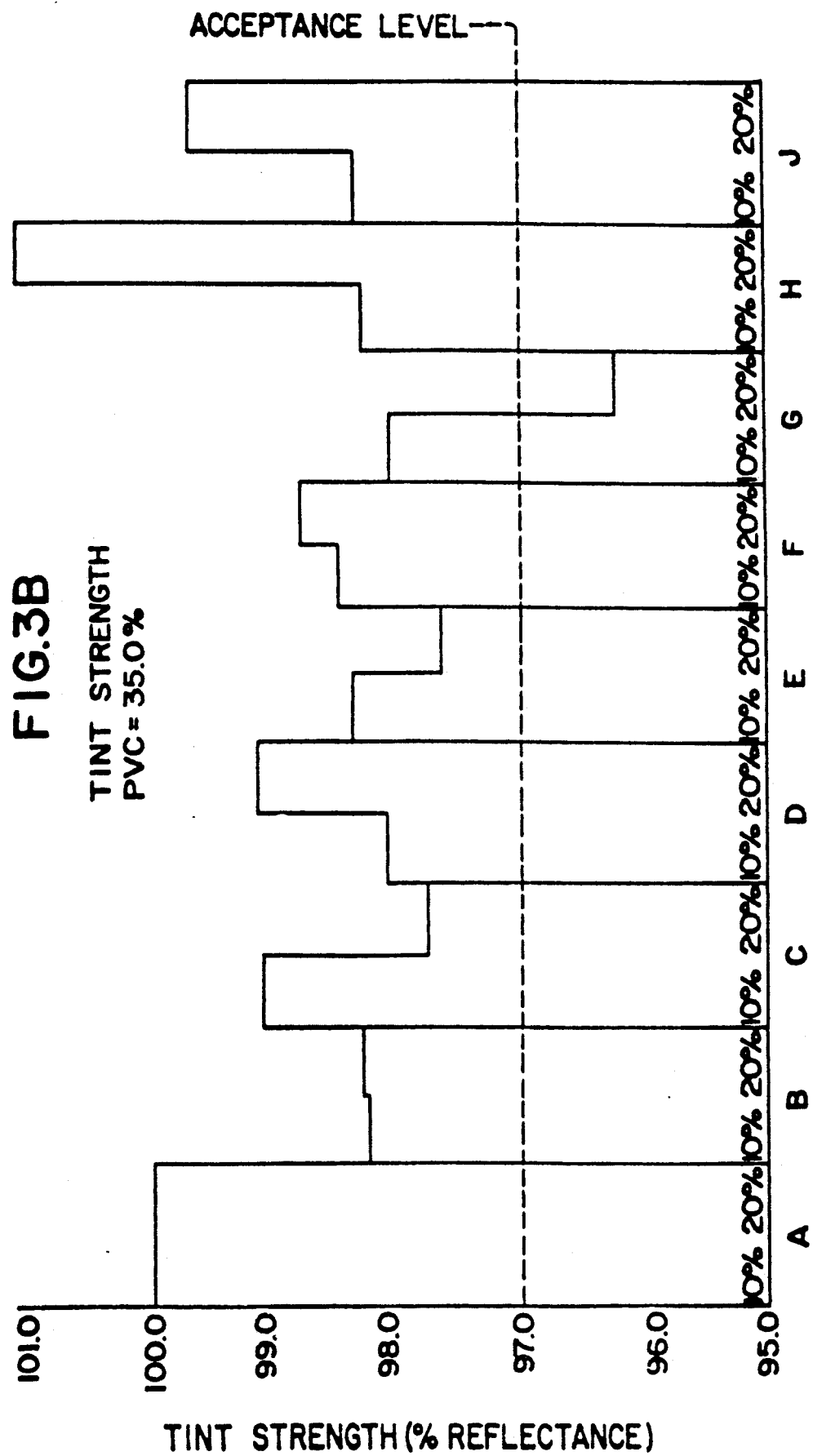

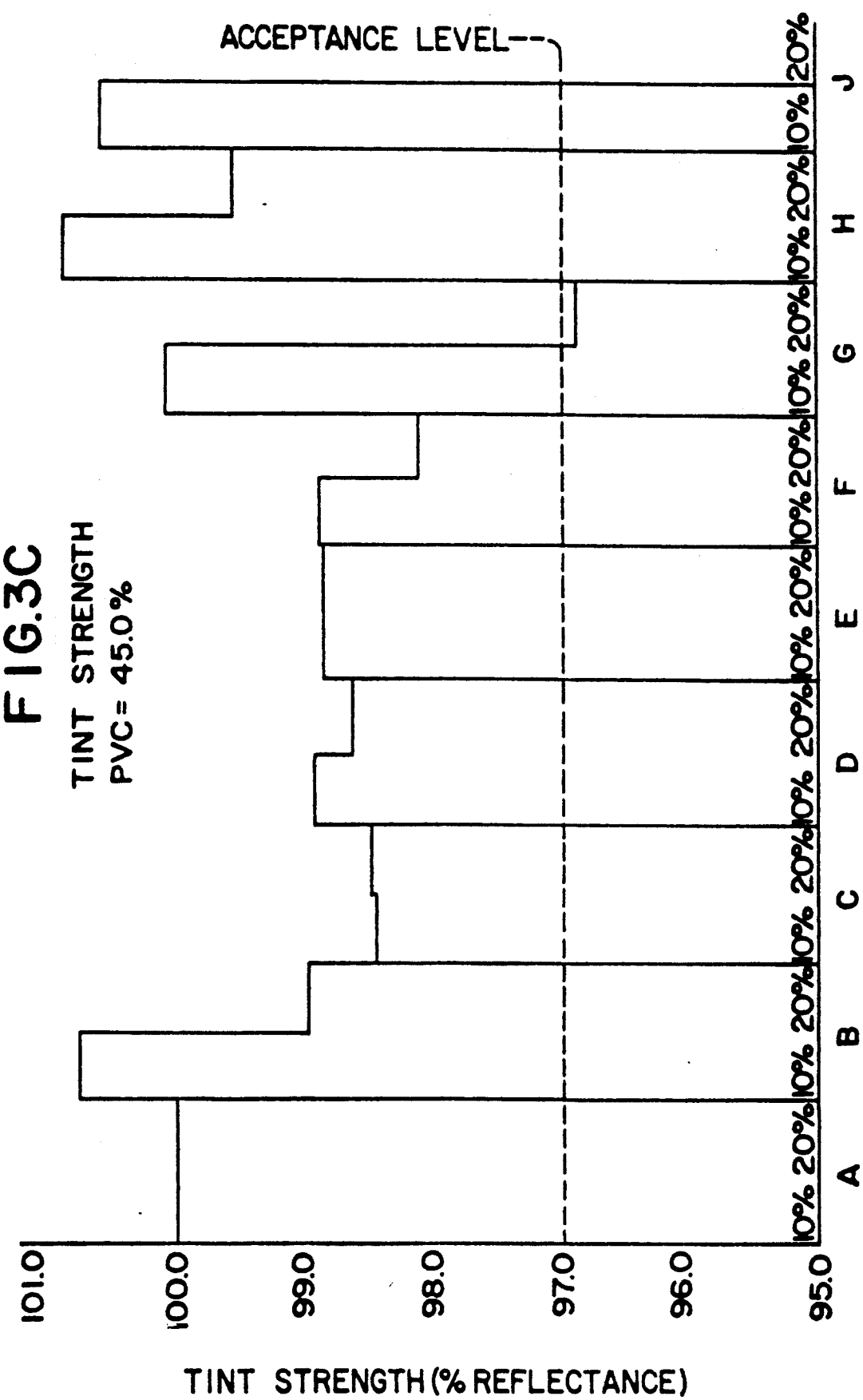

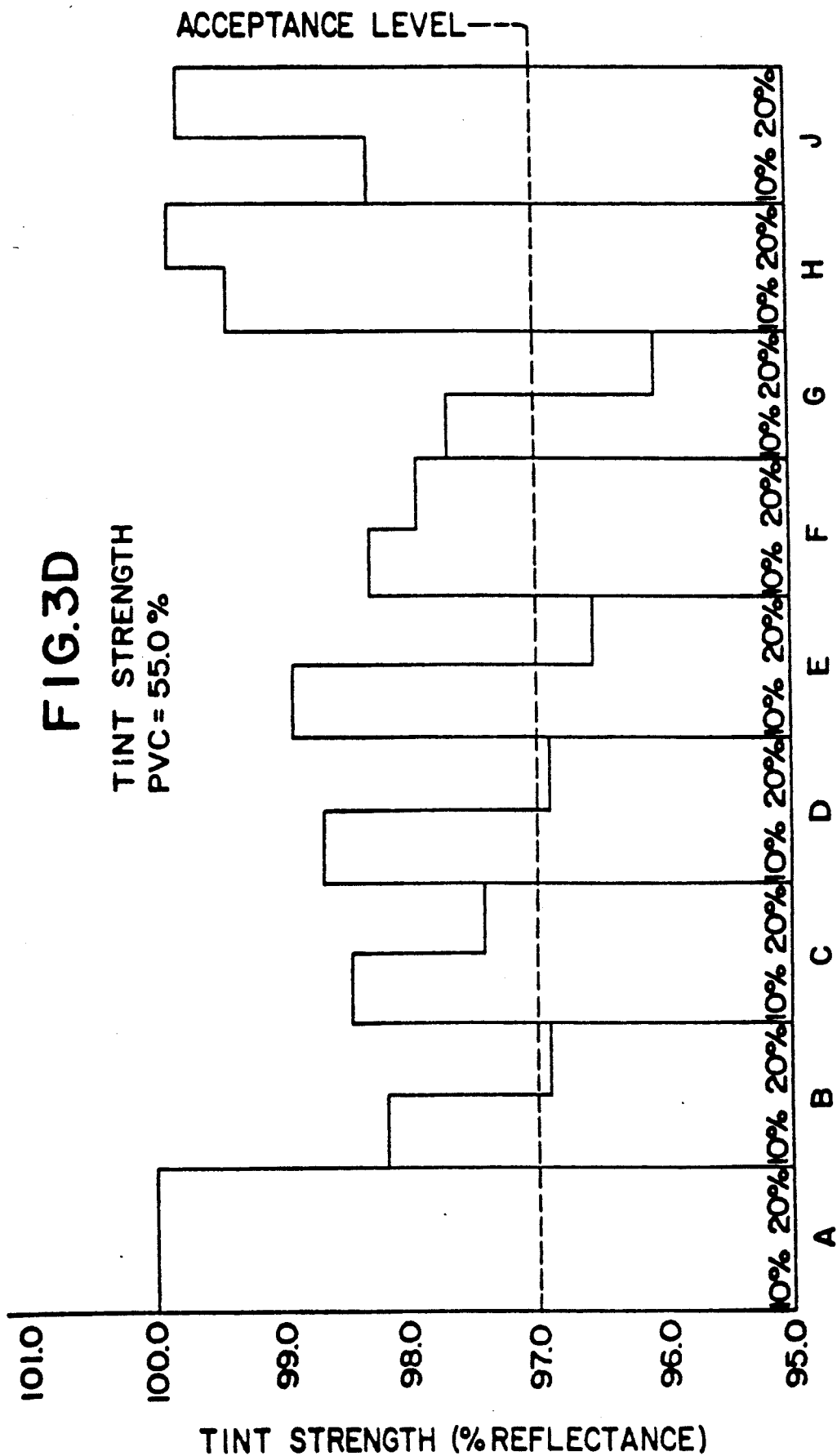

SPACER/EXTENDER FOR TITANIUM DIOXIDE IN PIGMENT SYSTEMS FOR COATINGS

FIELD OF THE INVENTION

The present invention relates to coating compositions and a method of applying such compositions to produce a coating on a suitable substrate, the coating composition preferably including titanium dioxide as a pigment component for developing opacity, usually referred to as "hiding", in the coating on the substrate.

BACKGROUND OF THE INVENTION

Coating compositions including pigment systems are well known and widely used in a variety of applications on different substrates. The coating compositions may be of a wide variety of types and are commonly characterized by having a pigment system including titanium dioxide as a pigment component for producing desired opacity or hiding in the resulting coating.

Generally, titanium dioxide is considered essential within such pigment systems because of its uniquely high index of refraction. The selection of titanium dioxide for this purpose is well known. Furthermore, it is also well known to preferably employ titanium dioxide in a rutile form having a median particle size of about 0.25 microns for producing optimum light scattering within a resulting coating.

As noted above, the general characteristics of such coating compositions including components other than the pigment system and the selection of titanium dioxide within the pigment system is well known. Accordingly, no further discussion of the desirability for employing titanium dioxide in such pigment systems is set forth for purposes of the present invention. However, it is to be understood that the present invention relates to coating compositions having titanium dioxide alone or usually in combination with other pigment components in their pigment systems, the titanium dioxide preferably being of a rutile form and having a median particle size of about 0.2 microns to about 0.3 microns, preferably about 0.25 microns, as noted above.

Pigment volume concentration (hereinafter referred to as "PVC") is a particularly important and well known parameter in connection with such coating compositions and particularly their pigment systems. That term is also important in further defining the field of the present invention in accordance with the following discussion.

With a PVC or titanium dioxide content of less than about 21-22%, titanium dioxide generally functions in an efficient manner to produce opacity as defined by hiding power. For purposes of the present invention it is to be understood that opacity and hiding are generally equivalent. Thus, in that range, hiding power is generally proportional to the amount of titanium dioxide in the pigment system. In most cases, it is generally necessary or desirable that titanium dioxide constitute a substantial portion of the pigment system in that range, at least for developing maximum hiding. Generally, any dilution of the titanium dioxide with other extender or filler pigments merely results in a reduction of hiding corresponding to the amount of titanium dioxide replaced by the other or substitute pigments, herein referred to as filler pigments.

An opposite extreme occurs in coatings produced from such coating compositions when the coating composition has a pigment system which is above a so-called critical pigment volume concentration (hereinafter termed "CPVC"). This term is also well know in the field of coatings and generally indicates a point at which the resin component in the coating formulation is no longer sufficient to entirely coat all of the pigment particles in a resulting coating.

Accordingly, for coating compositions above the CPVC, it is possible to rely on "dry hiding" where the index of refraction for titanium dioxide is no longer as critical. Generally, in such high PVC concentrations, other pigments which are very low cost in comparison to titanium dioxide, and which typically have much larger particle sizes than that referred to above, may be employed since the pigment particles are not entirely coated by the resin component in a resulting coating and the index of refraction for the pigments is less critical.

Actually, "dry hiding" begins to exhibit an effect well below the CPVC, usually at about 50% PVC, and becomes the dominant factor as soon as the CPVC is exceeded. Titanium dioxide is required for "wet hide"; otherwise, the coating or paint would have a very low level of opacity when wet.

The effect of a pigment in producing opacity is considered as follows. Light scattering occurs at interfaces between the resin and pigment particles and also between air and pigment particles. The greater the difference in refractive index for materials at the interface, the greater the amount of light scattering. For example, air has a refractive index of 1.0, most resins about 1.5-1.6, inert extenders or fillers about 1.55-1.65, rutile titanium dioxide about 2.71 and anatase titanium dioxide about 2.55. The indices of refraction for air and extenders are thus far enough apart to generate sufficient light scattering to develop hiding. Resins and extenders have about the same refractive index so that the extender is generally transparent within the resin. Resins and titanium dioxide are sufficiently far apart in refractive index to produce good hiding, thus the preference for titanium dioxide as a white hiding pigment.

The considerations discussed above for pigment systems either below a PVC of about 21-22% or above the CPVC are well known to those skilled in the art. It is also well known to those skilled in the art that in an intermediate range between a PVC of about 21-22% and up toward the CPVC, titanium dioxide tends to exhibit so-called "crowding" in a resulting coating so that maximum hiding efficiency is generally not achieved at least when titanium dioxide is employed along within such a pigment system. For this reason, substantial effort has been expended in the past to develop suitable spacer or extender pigments which are of relatively low cost, compared to titanium dioxide, in an attempt to minimize the crowding effects and optimize hiding efficiency of the titanium dioxide component in the pigment system. Generally, as noted above, such spacer or extender pigments have been most successful in pigment systems approaching or exceeding the CPVC where dry hiding power of the additional pigments can be employed.

For purposes of the present invention, coating compositions are contemplated as including a prime pigment or pigments having the primary functions of providing color and opacity in the resulting coating or paint. At noted above, titanium dioxide is commonly employed as the prime pigment for white compositions and also for substantially white formulations including tints of white or pastel colors. Other color pigments are employed with titanium dioxide in the pastel shades with lesser amounts of titanium dioxide being employed to produce deeper colors. Otherwise, the selection of such pigments is well known to those skilled in the art.

At the same time, other pigments which are commonly much less expensive than titanium dioxide are employed for other functions such as controlling gloss, controlling surface texture, and affecting exterior durability, porosity, permeability, etc. Generally, as noted above, such filler pigments are relatively large, typically in the range of 2–40 microns.

Accordingly, the present invention is defined below in connection with coating compositions having a prime hiding component and optionally a filler component. As further defined for the invention below, the coating compositions necessarily include at least about 21–22% by volume of titanium dioxide in order to exhibit "crowding". Furthermore, because of the substantial amount of titanium dioxide necessarily present according to the present invention, the coating compositions are also substantially white, including white formulations with titanium dioxide alone and tints of white or pastels where titanium dioxide is present above the range of 21–22% by volume of the total solid content of the coating.

The functions of crowding and spacing in coating compositions including titanium dioxide pigments, at least in accordance with the prior art for the present invention, was possibly best explained and defined by Juergen H. Braun, in an article entitled "Crowding and Spacing of Titanium Dioxide Pigments", *Journal of Coatings Technology*, Vol. 60, No. 758, March 1988, pp. 67–70.

SUMMARY OF THE INVENTION

There has accordingly been found to remain a need for spacer and/or extender pigments which are more effective in minimizing or eliminating the crowding conditions referred to above in order to more fully optimize hiding efficiency of the titanium dioxide component within a given pigment system. Whereas the prior art has generally involved the use of spacer or extender pigments having particle sizes substantially larger than the titanium dioxide pigment, it has been discovered in connection with the present invention that hiding power of titanium dioxide within the intermediate range referred to above can best be optimized with a spacer/extender pigment having a median particle size and particle size distribution generally similar to the median particle size and particle size distribution curve for titanium dioxide. More preferably, the present invention contemplates a spacer/extender pigment having substantially the same median particle size and particle size distribution curve as the titanium dioxide pigment employed in the same pigment system.

Dr. Braun, in the article noted above, recognized the inefficacy of filler pigments having relatively large particle sizes. By contrast, the present invention reflects the unexpected discovery that crowding effects of titanium dioxide and hiding efficiency for titanium dioxide can be enhanced, at least where titanium dioxide is present in a composition above about 21–22% by volume of total solids, by replacing a portion of the titanium dioxide with a spacer/extender pigment having about the same median particle size as the titanium dioxide particles. More preferably, the invention contemplates that the spacer/extender pigment has a median particle size within about ±20% that of titanium dioxide and more preferably substantially the same median particle size and particle size distribution as the titanium dioxide being employed in the composition.

The spacer/extender pigment of the present invention is even more preferably alumina trihydrate (ATH) which, in addition to being produced with such a median particle size and particle size distribution, also has oil absorption characteristics substantially the same as commercially available grades of titanium dioxide. In addition, the ATH spacer/extender pigment is compatible in a wide variety of compositions including solvent borne, water borne and 100% solids while also exhibiting good exterior durability and excellent dispersibility in all resin systems.

Accordingly, it is an object of the present invention to provide a coating formulation for producing coatings in a substantially white range, as defined above, and having a pigment volume concentration (PVC) of less than a critical pigment volume concentration (CPVC), the coating formulation having a pigment system including a prime hiding component and a filler component, the prime hiding component comprising about 70–98% by volume of titanium dioxide pigment ($TiO_2$) as one pigment component having a selected median particle size and particle size distribution, the $TiO_2$ pigment forming at least about 21–22% by volume of the total solid content of the coating formulation and therefore exhibiting "crowding" with less than maximum possible hiding, and about 2–30% by volume of aluminum trihydrate (ATH) as a spacer/extender pigment, the ATH spacer/extender pigment having a similar median particle size and and particle size distribution curve as the $TiO_2$ pigment for developing improved hiding efficiency of the $TiO_2$ pigment. For purposes of the invention, the above volume percentages are all set forth with respect to the total solid content of the coating composition.

The invention further preferably contemplates a PVC ranging from about 25% up to about 50–60%. This range tends to encompass semi-gloss coating formulations in a central portion of the range with some gloss formulations and flat formulations covered in opposite end portions of the range. The upper limit of about 50–60% tends to generally correspond with or approach the critical pigment volume concentration for different coating compositions. More preferably, the invention contemplates a pigment volume concentration ranging from about 25% to about 45% which broadly encompasses so-called "semi-gloss and low sheen" formulations wherein the present invention is believed to be particularly effective.

As noted above, the coating composition may be selected from a wide range of well known and available compositions, including solvent borne, water borne and 100% solids types, the present invention being particularly directed toward the pigment system for such compositions.

The invention also generally contemplates a range of available titanium dioxide pigments, useful in pigment systems for coating compositions. However, the invention preferably contemplates a rutile form of titanium dioxide preferably having a particle size of about 0.25 microns for optimum light scattering. In addition, the rutile form of titanium dioxide typically exhibits oil absorption in the range of 14–45. Oil absorption is defined herein as the number of grams of oil required to exactly wet 100 grams of pigment. (See ASTM Designation: 0281-84.)

The spacer/extender pigment preferably has a median particle size varying within a range of about ±20% compared to that of titanium dioxide. More preferably, the spacer/extender pigment has a median particle size and particle size distribution curve substantially the same as the median particle size and particle size distribution curve for the titanium dioxide pigment.

More preferably, the spacer/extender pigment is selected according to the present invention to have oil absorption characteristics similar to commercially available titanium dioxide pigments in order to facilitate substitution of the spacer/extender pigment for the titanium dioxide pigment in the pigment system. In addition, the spacer/extender pigment is preferably selected to be compatible with both solvent borne, water borne and 100% solids systems and/or to have good exterior durability for use in exterior formulations.

Very recently, an alumina hydrate pigment has been developed in accordance with the present invention to have a median particle size and particle size distribution curve very closely approaching the median particle size and particle size distribution curve for titanium dioxide. The alumina hydrate pigment commercially developed in accordance with the present invention, more specifically alumina trihydrate, is also preferred within the present invention since it exhibits similar oil absorption characteristics as titanium dioxide while being compatible with all resin types and further having good exterior durability to facilitate its use in exterior formulations.

In any event, the use of a spacer/extender pigment in a pigment system along with titanium dioxide in accordance with the present invention permits effective replacement of a portion of a titanium dioxide pigment otherwise exhibiting crowding in order to reduce the cost of the coating formulation while optimizing hiding efficiency of the titanium dioxide. This advantageous effect of the invention occurs within the PVC ranges discussed above.

More specifically, there are two alternative approaches to using a spacer/extender pigment selected in accordance with the present invention. Initially, an amount of titanium dioxide in a pigment system for a particular coating formulation, exhibiting crowding, may be maintained while adding the spacer/extender pigment of the present invention. In this manner, the hiding power or contrast ratio and tint strength of the formulation are increased because the titanium dioxide is employed more efficiently. In addition to enhanced hiding power, cost savings may be achieved because of additional coating volume resulting from the spacer/extender pigment.

Alternatively, a portion of the titanium dioxide in a pigment system for a given coating formulation may be replaced with an equal volume of such a spacer/extender pigment. This approach results in no loss of hiding (contrast ratio) or tint strength while material costs for the coating formulation are decreased even more substantially.

With the oil absorption of the spacer/extender pigment being selected to approximate that of the titanium dioxide pigment, the replacement of a portion of the titanium dioxide within the pigment system for a given coating formulation tends to permit various physical characteristics of the coating formulation, such as viscosity, gloss, side sheen, enamel hold-out and various application characteristics, to be maintained generally constant while replacing a portion of the titanium dioxide pigment with the spacer/extender pigment.

As noted above, the present invention preferably contemplates the use of alumina trihydrate with median particle size and particle size distribution as noted above because alumina trihydrate exhibits oil absorption characteristics very similar to those for commercially available grades of titanium dioxide. In addition, alumina trihydrate exhibits excellent exterior durability while being equally effective in all coating compositions. Alumina trihydrate may be readily incorporated into the pigment system for such coating formulations by conventional techniques such as high speed dispersion equipment and the like.

Additional objects and advantages of the invention are made apparent in the following description having reference to the accompanying drawings.

BRIEF DESCRIPTION OF THE DRAWINGS

FIG. 3A-D are bar graph representations summarizing tinting strength data (reflectance) for the examples of Tables I-III.

DESCRIPTION OF THE PREFERRED EMBODIMENTS

In accordance with the preceding summary, the present invention is directed toward coating compositions having pigment systems with titanium dioxide as a principal component for developing opacity or hiding power in a resulting coating. The coating compositions may have any of a variety of resin and vehicle components as are well know in the prior art. Although specific coating formulations are disclosed in examples set forth below, it will be apparent that similar examples according to the present invention may be prepared including any of the components referred to above together with a novel pigment system according to the present invention.

In addition to the pigment system having titanium dioxide as a principal component, the invention further contemplates coating compositions lying within an intermediate range of pigment volume concentrations extending up to the critical pigment volume concentration (CPVC) for the specific composition and containing at least 21-22% by volume titanium dioxide. For many coating compositions, the critical pigment volume concentration is approximately 50-60%. Since the effect of crowding for titanium dioxide is limited at volume percentages of about 21-22%, the benefit of a spacer/extender pigment according to the present invention is most noticeable above minimum PVCs of about 25%. Accordingly, a more preferred PVC range for the present invention extends from a minimum of about 25% to a maximum of about 50-60%.

Furthermore, the benefit of the alumina trihydrate spacer/extender pigment, discussed in greater detail below, is most beneficial in a PVC range of from about 25-45% corresponding generally to so-called "semi-gloss and low sheen compositions". Accordingly, that PVC range is even further preferred for the present invention.

The tendency for titanium dioxide pigment to exhibit "crowding" within the PVC range of interest in the present invention was briefly discussed above and, since crowding is believed to be well understood in the prior art, no further discussion is believed necessary. For purposes of the present invention, it is sufficient to understand that such crowding effects tend to cause the titanium dioxide pigment to exhibit less than its theoretically available or maximum possible hiding because of principles believed to be well understood by those skilled in the art.

Figure 1:
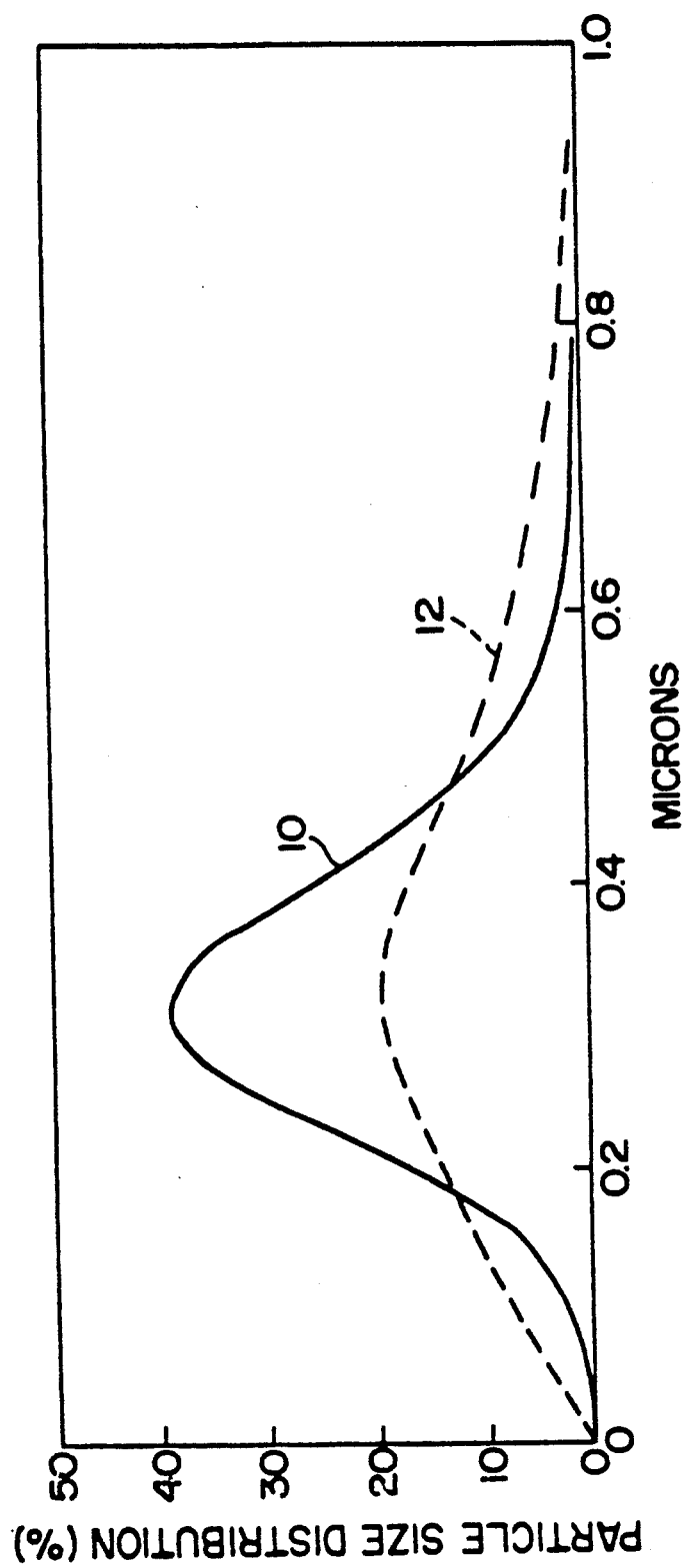
FIG. 1 is a graphical representation of a particle size distribution curve for titanium dioxide particles having a median particle size of about 0.25 microns in comparison with a particle size distribution curve for a spacer/extender pigment according to the present invention.

As was also noted above, titanium dioxide is an essential component for the pigment system of coating compositions contemplated by the present invention. In general terms, the invention contemplates all varieties of titanium dioxide employed within such pigment systems. However, it is also well documented in the prior art that the rutile form of titanium dioxide is most preferred in such pigment systems. Furthermore, a median particle size in the range of about 0.2–0.3 microns, more preferably about 0.25 microns, is commonly preferred in order to achieve optimum or maximum light scattering in a coating produced from the coating composition. Accordingly, rutile titanium dioxide particles are employed in the following examples having such a median particle size. A typical particle size distribution curve for the preferred titanium dioxide particle of the present invention is illustrated by the solid line curve indicated at 10 in FIG. 1. The comparison of that curve with a curve for a spacer/extender pigment according to the present invention is discussed in greater detail below.

Completing the characteristics of the titanium dioxide pigment, at least the preferred pigment discussed above as a specific oil absorption characteristic. Finally, the titanium dioxide has an index of refraction as noted above. Titanium dioxide is a particularly effective pigment agent for achieving hiding power because of its uniquely high index of refraction as discussed above.

As noted above, the present invention particularly contemplates a pigment system for such coating compositions wherein titanium dioxide is a principal component together with an ATH spacer/extender pigment functioning to optimize hiding efficiency by the $TiO_2$ pigment, particularly in pigment volume concentrations normally resulting in crowding effects being exhibited by the $TiO_2$ particles. As also noted above, the present invention novelly optimizes hiding efficiency for the $TiO_2$ pigment by maintaining the median particle size an particle size distribution curve for the spacer/extender pigment generally similar to the median particle size and particle size distribution curve for the titanium dioxide pigment employed in the pigment system. Generally, the invention contemplates that the median particle size for the spacer/extender pigment vary no more than about ±20% compared to the median particle size for the titanium dioxide pigment. A similar variation is generally believed possible between the particle size distribution curve for the ATH spacer/extender pigment, as indicated at 12 by a broken line in FIG. 1. However, the invention more preferably contemplates both the median particle size and the particle size distribution curve for the spacer/extender pigment ideally being substantially the same as those values for the titanium dioxide pigment. Accordingly, with the preferred titanium dioxide pigment having a median particle size of approximately 0.25 microns, the ATH spacer/extender pigment also preferably has a preferred median particle size of about 0.25 microns. At the same time, the preferred particle size distribution curve for the spacer/extender pigment preferably forms substantially an overlay for the particle size distribution curve 10 of the titanium dioxide pigment.

The particle size and particle size distribution for the ATH spacer/extender pigment is contemplated by the present invention for achieving desired spacing between the titanium dioxide particles in order to most effectively relieve crowding conditions.

The invention further contemplates that the ATH spacer/extender pigment also have oil absorption characteristics similar to those for the $TiO_2$ pigment employed in the instant pigment system. Maintaining similar oil absorption characteristics for the spacer/extender pigment and for the $TiO_2$ pigment facilitates substitution of the spacer/extender pigment for the $TiO_2$ pigment on a volumetric basis. More specifically, the absorption characteristics of the two pigments, particularly with respect to a resin component in the particular coating composition, determine whether various physical characteristics for the coating composition can be maintained while the relative proportions of components in the pigment system are varied. The present invention particularly contemplates alumina trihydrate as the preferred spacer/extender pigment since, in addition to being capable of production with similar particle size and particle size distribution values as titanium dioxide, it also has oil absorption characteristics closely similar to those for the titanium dioxide pigment as discussed above.

Alumina trihydrate is even further preferred since it is compatible with all resins, thus permitting its use in a wide variety of coating compositions. At the same time, alumina trihydrate also exhibits good exterior durability so that it is also very effective for use in exterior formulations.

A number of pigments have generally been available in the prior art for use as extenders in pigment systems with titanium dioxide but only in relatively large particle sizes, most typically about 2–40 microns and larger.

For example, a series of alumina trihydrate pigments is presently available from Solem Industries, Norcross, Ga., under the general trade designation PATH. The smallest in this series has a median particle size in the range of about 1.7–2.2 microns and is generally referred to as "ultra-fine" in particle size. However, since even this pigment has a particle size substantially above the range specified by the present invention, it has been found to be generally effective only for developing good dry hiding power in coating compositions having pigment systems above the critical pigment volume concentration.

Similarly, a series of hydrated alumina pigments is available from ALCOA INDUSTRIAL CHEMICALS DIVISION, Bauxite, Ark. These hydrated alumina pigments are available under the trade designation HYDRAL and include, for example, HYDRAL 705, HYDRAL 710 and HYDRAL PGA alumina pigments. The HYDRAL 710 alumina is referred to as having an "extra-fine, uniform particle size averaging about 1 micron in diameter" while the HYDRAL PGA alumina is similar to HYDRAL 710 alumina and the HYDRAL 705 alumina has a smaller average particle size which is still substantially larger than the preferred size range for the present invention.

More recently, the ALCOA INDUSTRIAL CHEMICALS DIVISION has developed another hydrated alumina pigment in accordance with the teachings of the present invention. That hydrated alumina pigment is an alumina trihydrate available from Schoofs Incorporated, Moraga, Calif. under the trade designation S-11ATH and was specifically developed for purposes of the present invention to have a median particle size of about 0.25 microns and a particle size distribution curve which is substantially and effectively an overlay for the preferred titanium dioxide pigment of the present invention.

The present invention also contemplates a method for coating a variety of substrates with a coating formulation of the type described above. Generally, such coating formulations may be applied to a variety of substrates including wood, wallboard, metal, plastics, concrete, etc. The coating formulation may be applied for example by brushing, rolling, spraying, dipping, etc. in thicknesses and under conditions as generally contemplated by the prior art for similar coating compositions. However, in accordance with the present invention, the coating formulation employed within the method is selected according to the parameters defined above and further exemplified in the following examples.

EXPERIMENTAL SECTION

Examples of coating compositions containing pigment systems contemplated by the present invention are described below and summarized in Table I. Although the examples are described with respect to certain selected components such as resins, vehicles and the like, the present invention particularly contemplates that similar examples could be formed with a variety of resins.

Turning now to the examples, the coating compositions are defined for the various examples of the invention as illustrated in Tables I–III.

Table I lists the various components employed in the coating compositions except for the spacer/extender pigments tested with respect to the present invention. Table II identifies a number of spacer/extender materials tested in addition to the ATH spacer/extender pigment of the invention. Table III then illustrates the composition for the different examples tested according to the present invention. More particularly, Table III indicates that the different pigments of Table II were substituted for either 10% or 20% by volume of the titanium dioxide in each of the control formulations illustrated in Table I.

Following the description of the examples illustrated in Tables I–III, various characteristics for those different examples are set forth, particularly in terms of contrast ratio data and tinting strength data as illustrated in FIGS. 2 and 3A–D.

Turning now to the examples, the coating compositions are described in greater detail below with combined reference to Tables I–III.

Table I indicates that four control compositions, indicated respectively as Control No. 1, Control No. 2, Control No. 3 and Control No. 4 were prepared having pigment volume concentrations (PVC) respectively of 25%, 35%, 45% and 55%. The composition for each of the controls included a pigment system with titanium dioxide as a prime pigment and optionally a filler pigment typically having a particle size many times larger than the titanium dioxide. The other components of each coating composition are then identified in Table I and described in substantially greater detail within the footnotes to Table I.

TABLE I

| Coating Compositions Component | CONTROLS #1-4 | | | |
|---|---|---|---|---|
| | #1 25 PVC | #2 35 PVC | #3 45 PVC | #4 55 PVC |
| Pigment System | | | | |
| Prime Pigment (TiO$_2$) (c) | 7.09 | 6.13 | 5.19 | 4.23 |
| Filler Pigment (d) | 0.43 | 5.09 | 9.25 | 13.36 |
| Other Components | | | | |
| Resin Dispersion (a) | 44.20 | 37.90 | 31.60 | 25.41 |
| Dispersion Medium (b) | 30.38 | 30.35 | 30.31 | 30.35 |
| Water | 17.40 | 20.53 | 23.65 | 26.65 |
| Total | 100% | 100% | 100% | 100% |

(a) The resin dispersion is a vinyl acetate/butyl acrylate copolymer, 55% solids content by wgt. in water, such as UCAR 376 available from Union Carbide Corp.
(b) The dispersion medium contains cellulosic thickener, associative thickener, propylene glycol, nonionic surfactant, neutralizer defoamer, coalescing agent and a biocide for in-can preservation. The dispersion medium has a total solids content of 3.23% by wgt. in water and was prepared by blending the above components in conventional fashion.
(c) The titanium dioxide prime pigment is a rutile form having a particle size of 0.2 microns available under the trade designation TI-PURE R-900 available from E. I. duPont deNemours.
(d) The optional filler pigment is a ground calcium carbonate having a median particle size of about 3.2 microns available under the trade designation VICRON 15-15 available from Pfizer Co.

The method of preparation for the controls of Table I is described followed by a description of Table II and III.

A method of preparation is described for Control No. 1 (25 PVC) followed by a brief description setting forth variations in the procedure for the other controls.

In preparing Control No. 1, very conventional techniques of coating or paint preparation were followed. Initially, the dispersion medium was weighed into a beaker or suitable container. The dispersion medium was then agitated by a high speed dispersion impeller while the pigment system was slowly sifted into the dispersion medium.

As the dispersion medium thickened, the speed of agitation was increased to the optimum dispersion speed for the impeller. Agitation was then continued until a satisfactory degree of dispersion was obtained (typically 5–10 minutes).

The speed of the impeller was then reduced to a normal agitation speed and the remaining components were sequentially added, including the resin dispersion, defoamer, coalescing agent and water.

A similar procedure was followed for preparing the other controls. The weight amounts of the pigment system were adjusted as indicated in Table I to achieve the different PVCs. Otherwise, the same steps were followed as described above for Control No. 1. In some instances, with the higher PVCs, it was necessary to add a portion of the water at an earlier stage of the preparation in order to prevent it from becoming overly viscous.

TABLE II

| Spacer/Extender Pigments In the Examples | |
|---|---|
| Spacer/Extender Pigment Designation | Description |
| A | None, Control only |
| B | ATH, S-11ATH |
| C | Calcined Alum. silicate, SATINTONE 5 |
| D | ATH, PATH 9 |
| E | Calcium carbonate, OMYACARB UF |
| F | Calcium carbonate, PFICARB H |
| G | Barium sulfate, BLANC FIXE 2278 |
| H | Hollow resin spheres, RHOPAQUE OP-62 |

TABLE II-continued

Spacer/Extender Pigments In the Examples

| Spacer/Extender Pigment Designation | Description |
| --- | --- |
| J | Barium sulfate, BLANC FIXE MICRO |

Referring now to Table II, the various spacer/extender pigments tested according to the present invention are identified in accordance with letter designations. The first letter designation (A) corresponded to the controls with no spacer/extender pigment being added.

The spacer/extender pigment indicated at (B) was the alumina trihydrate of the present invention indicated above as having the same median particle size and particle size distribution as the titanium dioxide. Furthermore, the alumina trihydrate pigment is available under the trade designation S-11ATH from Schoofs Incorporated (manufactured by Alcoa Industrial Chemicals Division).

The spacer/extender indicated at (C) was a calcined aluminum silicate having a median particle size of about 0.8 available under the trade name SATINTONE 5 available from Engelhard Corp.

The spacer/extender pigment indicated at (D) was another alumina trihydrate pigment having a median particle size of 1.7–2.2 microns available under the trade designation PATH 9 available from Solem Industries.

The spacer/extender pigment indicated at (E) was a wet ground natural calcium carbonate having a median particle size of about 0.8 microns and available under the trade name OMYACARB UF available from OMYA, Inc.

The spacer/extender pigment indicated at (F) was a natural calcium carbonate having a median particle size of about 1.2 microns and available under the trade name PFICARB H available from the Pfizer Co.

The spacer/extender pigment indicated at (G) was a precipitated barium sulfate having a median particle size of about 0.6 available under the trade name BLANC FIXE 2278 available from Whittaker, Clark & Daniels.

The spacer/extender pigment indicated at (H) was hollow resin sphere or bead having a median particle size of about 0.2–0.3 microns available under the trade name RHOPAQUE OP-62 available from Rohm & Haas, Inc.

The spacer/extender pigment indicated at (J) was micronized barium sulfate having a median particle size of about 0.8 available under the trade name BLANC FIXE MICRO available from Sachtleben (Germany).

TABLE III

Examples as Tested

| Example Designation | Control No. (Table I) | PVC | Spacer/Extender Pigment (Table II) | Percent Substitution (for TiO$_2$) |
| --- | --- | --- | --- | --- |
| 1 | #1 | 25% | A (none) | — |
| 2 | #1 | 25% | B | 10% |
| 3 | #1 | 25% | C | 10% |
| 4 | #1 | 25% | D | 10% |
| 5 | #1 | 25% | E | 10% |
| 6 | #1 | 25% | F | 10% |
| 7 | #1 | 25% | G | 10% |
| 8 | #1 | 25% | H | 10% |
| 9 | #1 | 25% | J | 10% |
| 10 | #1 | 25% | B | 20% |
| 11 | #1 | 25% | C | 20% |
| 12 | #1 | 25% | D | 20% |
| 13 | #1 | 25% | E | 20% |
| 14 | #1 | 25% | F | 20% |
| 15 | #1 | 25% | G | 20% |
| 16 | #1 | 25% | H | 20% |
| 17 | #1 | 25% | J | 20% |
| 18 | #2 | 35% | A (none) | — |
| 19 | #2 | 35% | B | 10% |
| 20 | #2 | 35% | C | 10% |
| 21 | #2 | 35% | D | 10% |
| 22 | #2 | 35% | E | 10% |
| 23 | #2 | 35% | F | 10% |
| 24 | #2 | 35% | G | 10% |
| 25 | #2 | 35% | H | 10% |
| 26 | #2 | 35% | J | 10% |
| 27 | #2 | 35% | B | 20% |
| 28 | #2 | 35% | C | 20% |
| 29 | #2 | 35% | D | 20% |
| 30 | #2 | 35% | E | 20% |
| 31 | #2 | 35% | F | 20% |
| 32 | #2 | 35% | G | 20% |
| 33 | #2 | 35% | H | 20% |
| 34 | #2 | 35% | J | 20% |
| 35 | #3 | 45% | A (none) | — |
| 36 | #3 | 45% | B | 10% |
| 37 | #3 | 45% | C | 10% |
| 38 | #3 | 45% | D | 10% |
| 39 | #3 | 45% | E | 10% |
| 40 | #3 | 45% | F | 10% |
| 41 | #3 | 45% | G | 10% |
| 42 | #3 | 45% | H | 10% |
| 43 | #3 | 45% | J | 10% |
| 44 | #3 | 45% | B | 20% |
| 45 | #3 | 45% | C | 20% |
| 46 | #3 | 45% | D | 20% |
| 47 | #3 | 45% | E | 20% |
| 48 | #3 | 45% | F | 20% |
| 49 | #3 | 45% | G | 20% |
| 50 | #3 | 45% | H | 20% |
| 51 | #3 | 45% | J | 20% |
| 52 | #4 | 55% | A (none) | — |
| 53 | #4 | 55% | B | 10% |
| 54 | #4 | 55% | C | 10% |
| 55 | #4 | 55% | D | 10% |
| 56 | #4 | 55% | E | 10% |
| 57 | #4 | 55% | F | 10% |
| 58 | #4 | 55% | G | 10% |
| 59 | #4 | 55% | H | 10% |
| 60 | #4 | 55% | J | 10% |
| 61 | #4 | 55% | B | 20% |
| 62 | #4 | 55% | C | 20% |
| 63 | #4 | 55% | D | 20% |
| 64 | #4 | 55% | E | 20% |
| 65 | #4 | 55% | F | 20% |
| 66 | #4 | 55% | G | 20% |
| 67 | #4 | 55% | H | 20% |
| 68 | #4 | 55% | J | 20% |

As indicated above, the Examples 1–68 as illustrated in Table III were formed by various combinations of the spacer/extender pigments from Table II with the different control compositions from Table I. For example, Example No. 1 was the Control No. 1 (25 PVC) with no spacer/extender pigment. Examples 2–9 are similar to Example 1 except that 10% by volume of the titanium dioxide is replaced respectively by the spacer/extender pigments from Table II.

Examples 10–17 similarly included Control No. 1 (25 PVC) with 20% by volume of the titanium dioxide replaced by the respective spacer/extender pigments from Table II.

Example 18 contained Control No. 2 (35 PVC) with no spacer/extender pigment. Examples 19–34 similarly included 10 and 20% (by volume) respectively of the spacer/extended pigments from Table II.

Example 35 contained Control No. 3 (45 PVC) with no spacer/extender pigment. Examples 36-51 also contained 10 and 20% (by volume) respectively of the spacer/extender pigments from Table II.

Finally, Example No. 52 contained Control No. 4 (55 PVC) with no spacer/extender pigment. Examples 53-68 respectively had 10 and 20% (by volume) of the titanium dioxide from Control No. 4 replaced by the spacer/extender pigments from Table II.

The coating compositions of Examples 1-68 were tested for both contrast ratio and tinting strength as a measure of relative opacity or hiding efficiency in accordance with the present invention. The methods for measuring both of these values are briefly described below.

Initially, contrast ratio was measured by preparing the coating compositions of Examples 1-68 to be standardized against each other except for the desired variations. Drawdowns were then prepared of each composition in a similar manner on black and white contrast ratio charts. The reflectance on both the white and black backgrounds were then measured in a conventional manner with a reflectometer. The results of those measurements are graphically indicated in FIG. 2.

At the same time, similarly standardized coating compositions corresponding to Examples 1-68 were prepared and tinting strength for each composition was measured as follows. A standard amount by wgt. of the coating composition for each example was combined with a standard amount, for example about 1% by wgt., of a colored concentrate. Drawdowns were then prepared for each of the examples with the coating compositions having substituted titanium dioxide being compared with the respective standards on a side-by-side basis. Generally, a 3% variation is considered acceptable with a 1% variation being desirable. Normally, a 1% variation is usually not discernible by the human eye while a 3% variation can usually be detected but is considered acceptable. The results of those tests are graphically indicated in FIGS. 3A-D.

Figure 2:
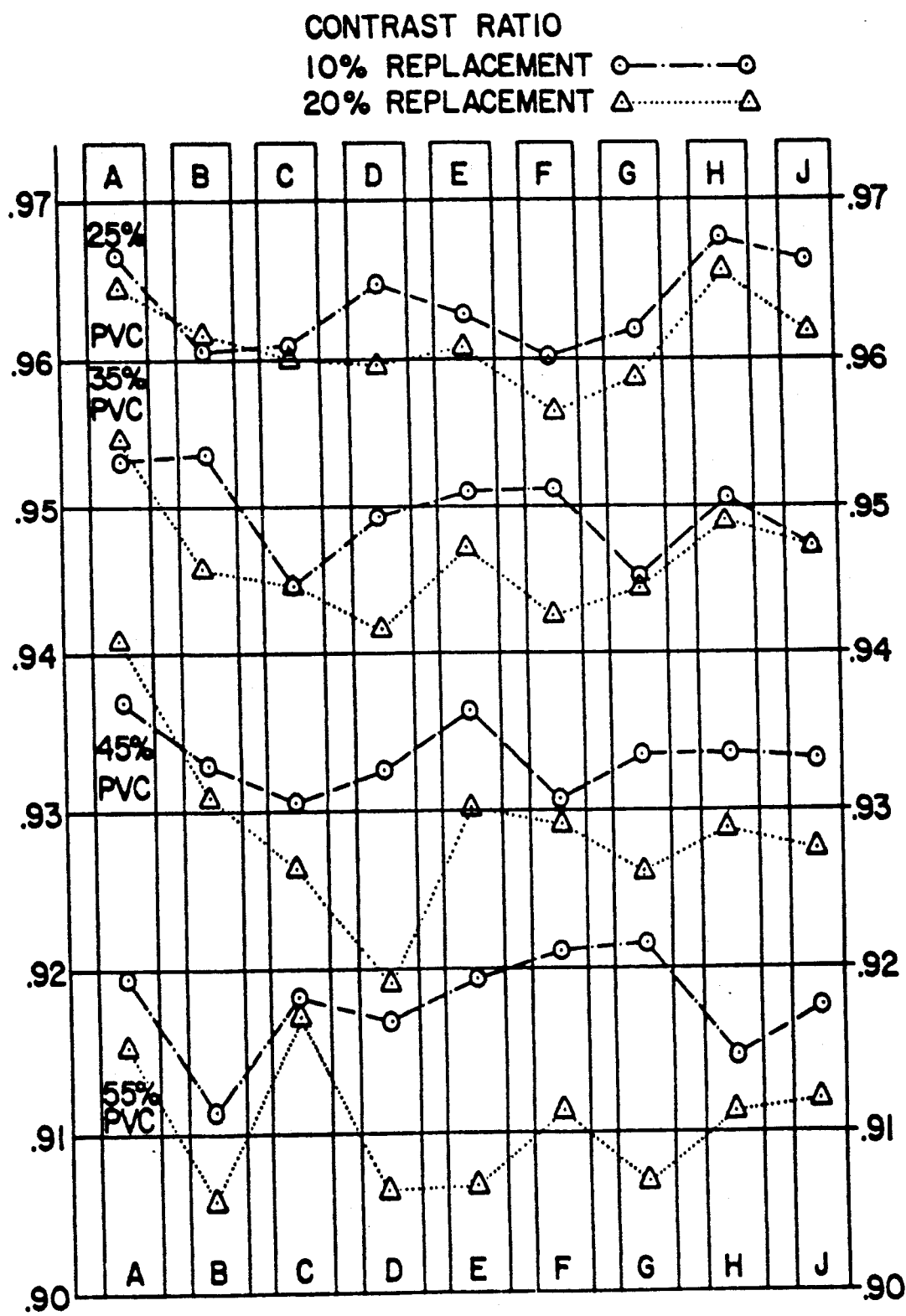
FIG. 2 is a graphical representation summarizing contrast ratio data for the examples of Tables I-III.

The data graphically represented in FIGS. 2 and 3 indicates generally that the preferred S-11ATH alumina trihydrate is a particularly good spacer/extender pigment for use in replacing a portion of titanium dioxide in accordance with the present invention.

More specifically, the graphical representation of contrast ratio data in FIG. 2 indicates, from the coating compositions of the examples, that the preferred S-11ATH alumina trihydrate has good efficacy as a titanium dioxide spacer/extender pigment generally over the range of from about 21-22% by volume of $TiO_2$ up to the critical pigment volume concentration, more specifically over a PVC range of from about 25% up to about 50-60% and even more particularly over a PVC range of from about 25% up to about 45%.

At lower PVC levels corresponding to high gloss coatings or paint, generally only the hollow resin spheres (H) demonstrated little or no loss of hiding strength. At higher PVC levels corresponding generally to interior flat paints, the larger sized filler pigments generally corresponding to the prior art were found to contribute significant dry hiding power.

Furthermore, the tint strength demonstrated for the S-11ATH alumina trihydrate in FIG. 3 was found to be good at all levels, possibly with the exception of the 55% PVC/20% $TiO_2$ substitution, and well within normal batch to batch tolerance of ±3%.

It is to be noted in association with the data from FIGS. 2 and 3 that alumina trihydrate also exhibits other desirable characteristics for use as a spacer/extender pigment according to the present invention including generally superior exterior durability compared to the other spacer/extender pigments in the examples. Similarly, the oil absorption of alumina trihydrate is desirable because it closely approximates that of titanium dioxide. In this regard, it is believed generally accepted that calcium carbonate, china clay, and BLANC FIXE (barium sulfate) are not considered suitable for exterior coatings or paints.

As noted above, a significant advantage for the S-11ATH alumina trihydrate is due to its relatively low oil absorption. Tests of the coating compositions for he examples showed no increase in viscosity at the 10% and 20% titanium dioxide substitution levels, no loss of gloss versus the controls and good gloss uniformity on surfaces of variable porosity.

All or a part of the above examples could be readily duplicated with the prime components of the pigment systems including a small amount of various color tints in order to produce coatings or paints in tints of white or pastel shades. Such coating compositions would have generally the same characteristics as exhibited above, particularly with the ATH pigment of the present invention, as long as the titanium dioxide content in the coating composition remains within the ranges specified above.

There have accordingly been disclosed a number of coating compositions and methods of application for coating compositions in accordance with the present invention demonstrating the efficacy of alumina trihydrate as a spacer/extender pigment in accordance with the present invention. The scope of the present invention is not to be limited by the preceding discussion or examples but only the following appended claims which are further exemplary of the invention.

What is claimed is:

1. A coating composition for coatings in a substantially white range having a pigment volume concentration (PVC) of less than its critical pigment volume concentration (CPVC) based on a total solids content of the coating composition, the coating composition having a pigment system including a prime hiding component and an optional filler component, the prime hiding component comprising about 70-98% by volume of titanium dioxide pigment ($TiO_2$) as one pigment component and about 2-30% by volume of alumina trihydrate (ATH) as another spacer/extender pigment component, the $TiO_2$ pigment component having a median particle size in the range of about 0.2-0.3 microns and a selected particle size distribution, the prime hiding component taken as $TiO_2$ alone forming at least a sufficient percentage by volume of the total solids content of the coating formulation in order to exhibit "crowding", the ATH spacer/extender pigment component having a similar median particle size and particle size distribution as the $TiO_2$ pigment component for reducing the condition of crowding and thereby developing improved hiding efficiency of the $TiO_2$ pigment component.

2. The coating composition of claim 1 being selected from the class consisting of solvent borne, water borne and 100% solids types.

3. The coating composition of claim 2 wherein the $TiO_2$ pigment is a rutile form having a median particle size of from about 0.2 microns up to about 0.3 microns for optium light scattering in a coating formed from the coating formulation.

4. The coating composition of claim 3 wherein the ATH spacer/extender component has a median particle size of from about 0.15 to about 0.35 microns.

5. The coating composition of claim 2 having a PVC ranging from about 25% up to about 50-60%.

6. The coating composition of claim 5 having a PVC ranging from about 25% up to about 45%.

7. The coating composition of claim 1 wherein the ATH spacer/extender pigment component has a median particle size within about ±20% of the $TiO_2$ pigment component.

8. The coating composition of claim 7 wherein both the ATH spacer/extender pigment component and the $TiO_2$ pigment component have median particle sizes of approximately 0.25 microns.

9. The coating composition of claim 1 wherein the prime hiding component taken as $TiO_2$ alone forms at least about 21% by volume of the total solids content.

10. A method for applying a coating to a substrate to provide improved hiding efficiency comprising the steps of selecting a coating composition for coatings in a substantially white range having a pigment volume concentration (PVC) of less than its critical pigment volume concentration (CPVC) based on a total solids content of the coating composition, the coating composition having a pigment system including a prime hiding component and an optional filler component, the prime hiding component comprising about 70-98% by volume of titanium dioxide pigment ($TiO_2$) as one pigment component and about 2-30% by volume of alumina trihydrate (ATH) as another spacer/extender pigment component, the $TiO_2$ pigment component having a median particle size in the range of about 0.2-0.3% microns and a selected particle size distribution, the prime hiding component taken as $TiO_2$ alone forming at least a sufficient percentage by volume of the total solids content of the coating formulation in order to exhibit "crowding", the ATH spacer/extender pigment component having a similar median particle size and particle size distribution as the $TiO_2$ pigment component for by reducing the condition of crowding and thereby developing improved hiding efficiency of the $TiO_2$ pigment component, and applying the coating composition to the substrate.

11. The method of claim 10 wherein the coating composition is selected from the class consisting of solvent borne, water borne and 100% solids types.

12. The method of claim 11 wherein the $TiO_2$ pigment is a rutile form having a median particle size of from about 0.2 microns up to about 0.3 microns for optimum light scattering in a coating formed from the coating formulation.

13. The method of claim 12 wherein the ATH spacer/extender component has a median particle size of from about 0.15 to about 0.35 microns.

14. The method of claim 11 having a PVC ranging from about 25% up to about 50-60%.

15. The method of claim 14 having a PVC ranging from about 25% up to about 45% for forming a "semi-gloss coating".

16. The product formed by the method of claim 15.

17. The product formed by the method of claim 14.

18. The method of claim 10 wherein the ATH spacer/extender pigment component has a median particle size within about ±20% of the $TiO_2$ pigment component.

19. The method of claim 18 wherein both the ATH spacer/extender pigment component and the $TiO_2$ pigment component have median particle sizes of approximately 0.25 microns.

20. The method of claim 10 wherein the prime hiding component, taken as $TiO_2$ alone, forms at least about 21% by volume of the total solids content.

21. The product formed by the method of claim 19.
22. The product formed by the method of claim 13.
23. The product formed by the method of claim 12.
24. The product formed by the method of claim 11.
25. The product formed by the method of claim 10.

* * * * *